(12) United States Patent
Pochon

(10) Patent No.: US 8,599,646 B2
(45) Date of Patent: Dec. 3, 2013

(54) METHOD OF ULTRASOUND TELEMETRY FOR DRONES, WITH DISCRIMINATION OF SPURIOUS ECHOES EMANATING FROM ANOTHER DRONE

(75) Inventor: Benoit Pochon, Paris (FR)

(73) Assignee: Parrot, Paris (FR)

( * ) Notice: Subject to any disclaimer, the term of this patent is extended or adjusted under 35 U.S.C. 154(b) by 60 days.

(21) Appl. No.: 13/381,210

(22) PCT Filed: Jun. 17, 2010

(86) PCT No.: PCT/FR2010/051218
§ 371 (c)(1),
(2), (4) Date: Mar. 9, 2012

(87) PCT Pub. No.: WO2011/001059
PCT Pub. Date: Jan. 6, 2011

(65) Prior Publication Data
US 2012/0163125 A1    Jun. 28, 2012

(30) Foreign Application Priority Data

Jul. 2, 2009   (FR) ..................................... 09 54552

(51) Int. Cl.
*G01S 15/08*   (2006.01)
(52) U.S. Cl.
USPC ........................................................... 367/99
(58) Field of Classification Search
USPC ........................................................... 367/99
See application file for complete search history.

(56) References Cited

U.S. PATENT DOCUMENTS

| | | | |
|---|---|---|---|
| 4,845,682 A | | 7/1989 | Boozer et al. |
| 5,488,377 A | * | 1/1996 | Reynolds et al. ............... 367/98 |
| 6,545,946 B1 | | 4/2003 | Huss et al. |
| 2003/0112705 A1 | | 6/2003 | Nedwell |
| 2012/0163125 A1 | * | 6/2012 | Pochon .......................... 367/99 |

FOREIGN PATENT DOCUMENTS

DE   4003775 A1   8/1991

OTHER PUBLICATIONS

Qinghao Meng, "Review of Crosstalk Elimination Methods for Ultrasonic Range System in Mobile Robots", Proceeding of the 2006IEEE/RSJ International Conference on Intelligent Robots and Systems, Oct. 9-15, 2006, pp. 1164-1169.

* cited by examiner

*Primary Examiner* — Daniel Pihulic
(74) *Attorney, Agent, or Firm* — Haverstock & Owens LLP

(57) ABSTRACT

The method comprises: a) the emission of an ultrasound burst repeated at a predetermined recurrence frequency; and b) after each emission and for the duration of a time frame (n−1, n, n+1, ... ) separating two consecutive emissions, the reception of a plurality of successive signal spikes appearing in the course of the same frame. These spikes include spurious spikes ($E'_{n-1}$, $E'_n$, $E'_{n+1}$, ... ) originating from the emitter of another drone, and a useful spike ($E_{n-1}$, $E_n$, $E_{n+1}$, ... ) corresponding to the distance to be estimated. To discriminate these spikes, the following steps are executed: c) for two consecutive frames, comparison of the instants of arrival of the p spikes of the current frame with the instants of arrival of the q spikes of the previous frame and determination, for each of the p.q pairs of spikes, of a corresponding relative time gap; d) application to the p.q gaps determined in step c) of a selection criterion making it possible to retain just a single spike of the current frame; and e) estimation of the distance as a function of the instant of arrival of the spike thus retained.

9 Claims, 1 Drawing Sheet

METHOD OF ULTRASOUND TELEMETRY FOR DRONES, WITH DISCRIMINATION OF SPURIOUS ECHOES EMANATING FROM ANOTHER DRONE

The invention relates to distance estimation by a method of ultrasonic telemetry implemented by drones, in particular for measuring the altitude at which the drone flies.

The drone is provided with an electroacoustic transducer for emitting and receiving ultrasound waves. Such transducer emits a short ultrasound burst of a few tens or hundreds of microseconds, and waits for the acoustic echo sent back after reflection on the ground. The time period separating the burst emission from the echo reception makes it possible—the velocity of sound being known—to estimate the length of the acoustic path travelled and thus to evaluate the altitude of the drone.

Such measurement is reiterated at close intervals, with a periodicity of ultrasound burst emission corresponding to a frequency referred to as the "recurrence frequency", generally related to the operating frequency of the drone's inertial unit. The time period separating two bursts, called the "acquisition period" or "time frame", is dedicated to detecting the acoustic signal peak(s) corresponding to the reception of an echo. Generally, such analysis is performed digitally, wherein the time elapsed from the ultrasound burst is expressed as a number of samples, counted at the sampling frequency of the digital circuit.

Such technique, used in very different applications, is described, in particular, in the U.S. Pat. No. 4,845,682 A (for avoidance between robot conveyors of a production line all using the same type of ultrasound sensor), U.S. Pat. No. 6,545,946 B1 (for a liquid level sensor in a tank, with spurious echo filtering), DE 4003775 A1 (for anti-collision radars, taking into account vehicles coming in the reverse direction and also equipped with radars of the same type), or US2003/112705 A1 (for a helicopter altimeter, with compensation for the non-reciprocity between the ultrasound emission and reception transducers).

In practice, after a single burst has been emitted, the transducer receives a plurality of echoes, resulting from multiple reflections or from reflections on other targets than the ground.

The ultrasonic telemetry has indeed the particularity not to be very directional, and thus to be subject to the multiplication of spurious echoes. When several similar drones are flying simultaneously close to each other, a particular difficulty arises, lying in the fact that during the acquisition period that follows a burst emission, a drone can receive not only echoes of its own signal (one useful echo, corresponding to the reflection on the ground, or spurious echoes produced by other reflections of this same signal), but also acoustic signals coming from transducers of other drones, which thus leads to a measurement disturbance.

It is rather easy to filter the spurious echoes produced by the multiple reflections, because they appear the more often after the arrival of the actual echo. On the other hand, it k very difficult to discriminate the echoes coming from a burst emitted by another drone, in particular in case of propagation paths with relatively similar lengths.

The present invention aims to solve this particular problem of measurement disturbance in the presence of several similar drones operating simultaneously.

The basic idea of the invention lies in the fact that, if slightly different recurrence frequencies are provided for two drones, it will be observed, for a given drone, as the successive acquisition frames go along, a drift in the position of the peak corresponding to the echo received from the other drone.

The invention proposes to use such property for recognizing and filtering the spurious peaks coming from a burst emitted by another drone, so as to retain only the useful peak corresponding to the distance to be estimated from the echo produced by the ultrasound burst emitted by the considered drone.

More precisely, the invention proposes a method comprising, in a manner known per se:

a) emitting, from a time origin, an ultrasound burst, said burst being repeated at a predetermined recurrence frequency;

b) after the end of each emission and over the duration of a time frame separating two consecutive emissions, receiving a plurality of successive signal peaks appearing at respective times of arrival during the same frame, wherein said successive signal peaks include spurious peaks and one useful peak corresponding to the distance to be estimated.

The method according to the invention is characterized in that:

it is provided a preliminary step of adjusting said recurrence frequency to a predetermined value different from the corresponding recurrence frequency of another drone intended to be used at the same time as the considered drone, the step b) includes the possible reception of spurious peaks due to the emission of ultrasound bursts from the other drone; and for the considered drone implementing the method, the method further comprises:

c) for two consecutive frames, comparing the times of arrival of the p signal peaks of the current frame with the times of arrival of the q signal peaks of the previous frame, and determining, for each of the p.q pairs of peaks, a corresponding relative time gap;

d) applying to the p.q relative time gaps determined at step c) at least one criterion of selection making it possible to retain only one peak of the current frame; and e) estimating the distance based on the time of arrival of the peak retained at step d) with respect to the time of emission of the last burst.

Very advantageously, the respective recurrence frequencies of the considered drone and of the other drone are adjusted so that the difference between these frequencies verifies the following relation:

$$\text{abs}(F_1-F_2)/\max(F_1,F_2) > 2*V_{max}/c + W*\min(F_1,F_2)/F_s$$

wherein:

$F_1$ is the recurrence frequency of said considered drone, $F_2$ is the recurrence frequency of said other drone, $V_{max}$ is the maximum velocity, in the direction of estimation of the distance, of said considered drone, c is the velocity of sound propagation, W is the time width of the burst, and $F_s$ is the sampling frequency of the received signal.

The difference between the recurrence frequencies of the considered drone and of the other drone is advantageously comprised between 3% and 10%, preferably of 5%.

Advantageously, the step d) includes, as another criterion of selection, a filtering by which are retained only the peaks of the current frame for which the relative time gap with the peaks of the previous frame is lower than a predetermined threshold.

In a first embodiment, the threshold is determined as a function of the maximum variation of the acoustic path between two positions of the drone at two consecutive times of emission, for a displacement of the drone at its maximum velocity in the direction of estimation of the distance. This threshold may notably be determined by the expression:

$$D=2*V_{max}*F_s/(c*F_{drone})$$

wherein:

D is the threshold value expressed as a number of samples, $V_{max}$ is the maximum velocity of the drone in the direction of estimation of the distance, $F_s$ is the sampling frequency of the received signal, c is the velocity of sound propagation, and $F_{drone}$ is the recurrence frequency of the burst emissions.

In a second embodiment, the above-mentioned threshold is increased by a corrective term that is a function of the time width of the ultrasound burst, in particular in accordance to the expression:

$$D=2*V_{max}*F_s/(c*F_{drone})+W.F_s,$$

wherein:

W is the time width of the burst, expressed as a number of samples.

In case a plurality of peaks are kept after the filtering resulting from the application of the above-mentioned threshold, the step for keeping only one peak, step d), may provide for selecting as this single peak the one that appears in first (or, as a variant, the last one) in the current frame, in the order of appearance of the successive signal peaks.

In an advantageous variant, at the end of step c) of comparing the times of arrival of the p signal peaks of the current frame with the times of arrival of the q signal peaks of the previous frame, and of determining, for each of the p.q pairs of peaks, a corresponding relative time gap, in case of detected presence of two peaks in the same relative time gap interval, it is then provided a step of selecting the single peak of the previous frame for the distance estimation at step e), instead of that of the current frame.

An exemplary embodiment of the invention will now be described, with reference to the appended drawings in which the same reference numbers designate identical or functionally similar elements.

FIG. 1 schematically illustrates two drones flying close to each other, and shows the various signals liable to be detected by the ultrasonic transducer.

Figure 1:
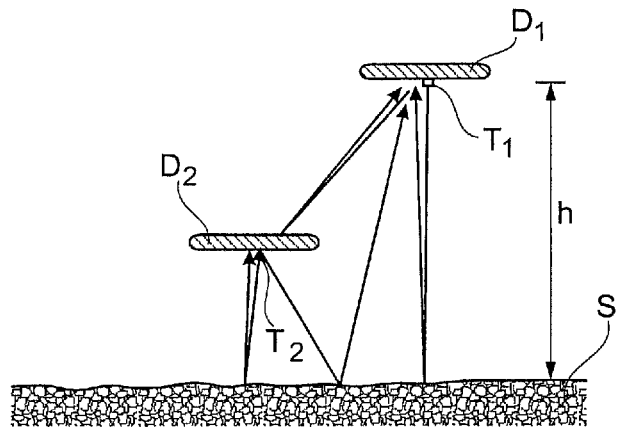

In FIG. 1, a drone D1 flying at an altitude h above the ground S is shown. The drone D1 is provided with an electroacoustic transducer T1 for emitting/receiving ultrasound waves toward the ground.

The normal technique of telemetry consists in emitting toward the ground a short ultrasound burst (for example, of 300 µs), and in counting the return time after reflection on the ground, to deduce the altitude h therefrom.

A particular difficulty arises when another drone D2, of a design similar to that of the drone D1, flies close to D1. This drone is also provided with a transducer T2 similar to T1, which also emits ultrasound bursts, at a recurrence frequency close to the recurrence frequency of the ultrasound emission by the transducer T1.

The acoustic signal received by T1 is thus liable to be disturbed by the echoes of the signal emitted by T1 and reflected on D2 (which might be mistaken for the ground S), and one the other hand and above all, by the ultrasound waves emitted by T2 and detected by T1.

Taking into account the relatively close recurrence frequencies of D1 and D2, the later signal may introduce high disturbances, for example if the drones fly at comparable altitudes. In this case, the drone D1 can no longer make the distinction between the echoes from the bursts emitted by its own transducer T1 and the echoes from the burst emitted by the transducer T1 of the other drone D2.

The essential object of the invention is to overcome such difficulty. Beforehand, the respective recurrence frequencies of the drones D1 and D2 are adjusted so as to have a slight difference, typically of the order of 3 to 10%, preferably of 5% (the reasons and criteria of this frequency choice will be explained hereinafter).

In order to better understand this choice of recurrence frequencies, let's calculate the minimum apparent velocity of the disturbing drone during two successive frames. If T and T' (respectively F and F') are the recurrence periods (respectively, recurrence frequencies) of the two drones, then the displacement seen by a drone is $d_{min}=(T'-T)*c$ (c being the velocity of sound).

Such displacement is reached when the drones move in opposite directions—a configuration corresponding to an apparent velocity $v_{apparente}=d_{min}/T$. With a frequency difference of x %, (i.e. $F'=F*(1+x/100)$), this apparent velocity is about $v_{apparente}=c*x/100$. An apparent velocity of the order of 17 m/s is thus obtained for a difference of 5%, which is far higher than the velocities that are to be measured (of the order of 1 m/s).

The small recurrence frequency difference between the two drones will cause, over the successive frames of acquisition of the echoes received by D1, a slight drift of the echoes from the transducer T2 of the other drone D2, with respect to the echoes from its own transducer T1.

The way this phenomenon can be detected and analyzed to discriminate the useful echoes coming from the transducer T1 from the spurious echoes coming from the transducer T2 of the other drone will now be described.

Figure 2:
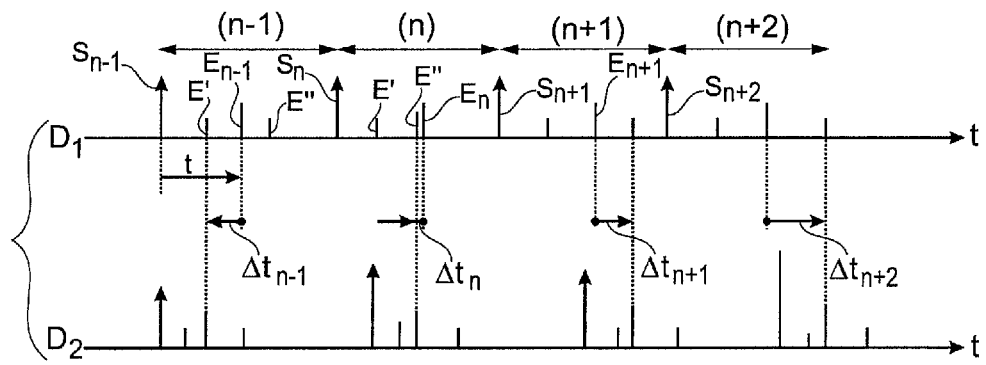
FIG. 2 illustrates two timing-charts showing, for each of the two drones of FIG. 1, the various times of emission and reception of the ultrasonic acoustic signal.

In FIG. 2, four successive acquisition frames, referred to as (n−1), (n), (n+1) and (n+2), following successive burst emissions at the times $S_{n-1}$, $S_n$, $S_{n+1}$ and $S_{n+2}$, are shown in the timing-chart D1.

In response to the emission of the burst $S_{n-1}$, the transducer T1 of the drone D1 receives a useful echo $E_{n-1}$, corresponding to the reflection on the ground and representative of the actual altitude of the drone. But this useful echo is disturbed by other echoes such as E' and E", coming from bursts emitted by the other drone (timing-chart D2 in FIG. 2). However, because of the slight recurrence frequency difference between the two drones—the difference has been emphasized in FIG. 2 for clarity of illustration—the deviation $\Delta t_{n-1}$, $\Delta t_n$, $\Delta t_{n+1}$, $\Delta t_{n+2}$ . . . between the useful peak $E_{n-1}$, $E_n$, $E_{n+1}$ . . . and the spurious peak E' will vary over the successive frames. On the other hand, the time period t separating the useful echo $E_{n-1}$, $E_n$, $E_{n+1}$ . . . from the time origin consisting of the time of emission of the corresponding burst $S_{n-1}$, $S_n$, $S_{n+1}$ . . . , will not or almost not vary.

Therefore, during the successive frames, some peaks (including the useful peak) will not or not much vary, while other peaks (the spurious peaks due to the ultrasound waves emitted by the other drone) will show a significant drift that will make it possible to identify and thereafter eliminate them.

To perform this discrimination, the analysis algorithm stores, for each frame, the times of occurrence of the p peaks received during the frame number (n−1) as a Table $T_{n-1}$ $[i_{1,n-1}, i_{2,n-1}, \ldots i_{p,n-1}]$ (wherein the time is expressed as a number of samples from the beginning of the burst, in the form of an index i representative of the position of the peak on the time scale).

The operation is repeated for the following frame: $T_n[i_{1,n}, i_{2,n}, \ldots i_{q,n}]$ for the q peaks detected during such frame (most of time p=q).

The algorithm then calculates, for each of the p.q pairs of peaks, the corresponding relative time gap, and retains only the peaks for which, among the q peaks of the current frame, this relative time gap is lower that a given threshold D (the way this threshold is determined will be explained hereinafter). Indeed, if the relative time gaps are higher than the threshold, it reveals a significant drift of the peak from one frame to the other, which reveals the spurious character of the peak.

If, at the end of this filtering process, several peaks still remain, an additional criterion is applied, by retaining for example only the first peak of the frame in the order of occurrence of the successive peaks (which is equivalent to assume that the subsequent peaks correspond to multiple reflections, and are thus spurious peaks).

It is also possible, in some configurations, to retain, instead of the first peak, the last peak in the order of occurrence, for example in presence of spurious echoes corresponding to a reflection on another drone rather than a reflection on the ground.

In practice, the number of peaks detected during a same frame hardly exceeds 5, so that the comparison number of the times of arrival does not exceed 25, which remains reasonable regarding the required computation power.

The altitude is estimated as a function of the instant of arrival of the peak finally retained.

An improvement of the algorithm just described consists, at the end of the comparison between the q peaks of the current frame and the p peaks of the previous frame, if there are two peaks in the same time interval D, in taking only the peak of the previous frame, rather than that of the current frame, as a height indicator.

Indeed, it is empirically noted that the drone is often in hovering flight and that the spurious peaks are the ones which appear the more often, and choosing arbitrarily the first or the second peak in the time interval D would lead to a greater error (increased by D).

The way the detection threshold D is determined will now be described, with reference to FIG. 3.

The following notations are used:
D threshold value expressed as a number of samples,
$V_{max}$ maximum velocity of the drone in the direction of estimation of the distance,
$F_s$ sampling frequency of the received signal,
c velocity of sound propagation,
$F_{drone}$ recurrence frequency of the burst emissions, and
W time width of the burst, expressed as a number of samples.

The difference of acoustic path between two successive burst emissions is, for a drone moving at its maximum velocity in the direction of estimation of the distance, lower that $2 V_{max} \cdot T_{drone}$, i.e. in terms of number of samples:

$$D = 2 * V_{max} * F_s / (c * F_{drone}).$$

Figure 3:
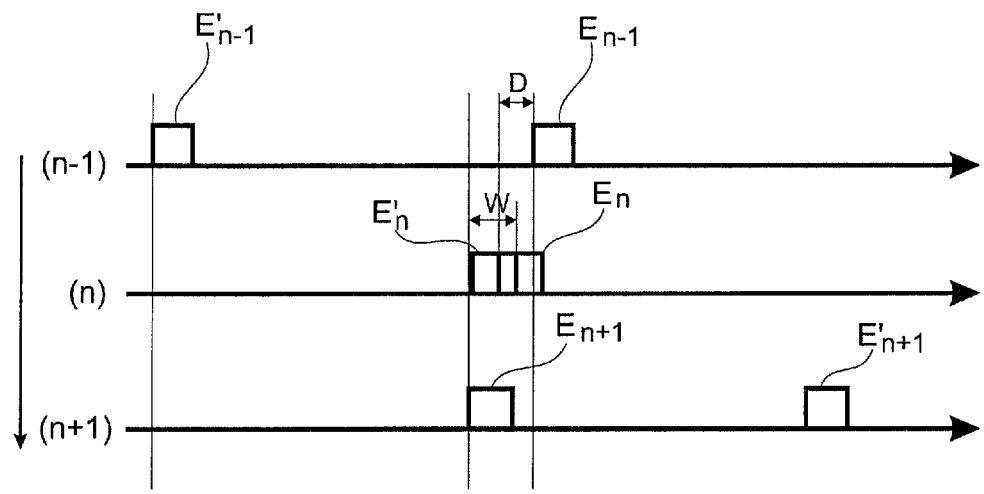
FIG. 3 shows the time position, during three successive acquisition frames, of the received signal peaks and the way to discriminate them.

However, a difficulty arises when, as illustrated in FIG. 3, the spurious peak $E'_n$ overlaps the useful peak $E_n$ during a given frame (the frame number n in FIG. 3). It can be seen in this figure a shifting of the useful peak $E_{n-1}$, $E_n$, $E_{n+1}$, during the successive frames (n−1), (n), (n+1). Such shifting is due to the displacement of the drone in the direction of estimation of the distance (typically an ascensional displacement), but it is very lower than the displacement of the spurious peak $E'_{n-1}$, $E'_n$, $E'_{n+1}$, such displacement being essentially due to the difference between the recurrence frequency of the drone D2 and that of the drone D1.

To handle the case of overlapping of the useful and spurious peaks $E_n$ and $E'_n$, two possibilities may be conceived.

The first possibility consists in retaining as the threshold the above-expressed value D, which results in that the frame n does not contain any valid peak and in that no distance can be estimated for this frame.

Another possibility consists in increasing the threshold by a corrective term $W.F_s$: in this case, a valid peak will be actually detected for the frame n, but with an additional error (W) regarding the position of this peak, thus with an additional error regarding the estimation of altitude of the drone. By way of non-limitative illustration, a numerical example will now be considered, based on the following values:
$V_{max} = 1.5$ m/s
$F_s = 150$ kHz
c = 340 m/s
$F_{drone} = 50$ Hz
W = 0.3 ms.

Considering these values, the threshold D without corrective term is D=26 samples, i.e. an error of 3 cm regarding the drone altitude at the sampling frequency considered.

If the threshold D is increased by the corrective term $W.F_s$, the detection threshold increases to 26+45=71 samples, i.e. an error of 8 cm regarding the altitude.

The first technique thus provides higher measurement accuracy, but with a greater number of invalid frames (the rate of erroneous measurements can be estimated by simulation to 1 per second). On the other hand, the second technique delivers measurements for almost all the frames, but with lower accuracy.

The way the recurrence frequencies of the drones are chosen, as a function in particular of the determined threshold D, will now be explained in detailed.

The frequencies of the two drones are adjusted to a fixed value from the beginning, and are subsequently kept at this value (a dynamic change of the frequencies would require communication between the drones, which needlessly complicates the process). The choice of these frequencies is a compromise:
  on the one hand, close frequencies are desired, so that the drones have altitude estimation systems with similar reactivity;
  on the other hand, the threshold D used in the comparison is related to the maximum relative velocity of the two drones, and is thus independent of the frequency choice: therefore, if the frequencies are too close to each other, it might be a case in which the relative displacement between the drones is lower than D.

To take these constraints into account, the respective frequencies F and $F_2$ of the drones D1 and D2 may be chosen as follows. For the drone D1, because of the relative maximum velocity of the drones between each other, the threshold is equal to:

$$D_1 = 2 * V_{max} * F_s / (c * F_1).$$

The minimum apparent velocity of the drone D2 seen by the drone D1 is (in the case where the drones fly in the same direction):

$$(1/F_1 - 1/F_2) * F_s.$$

Therefore, the following relation must be verified:

$$abs(1/F_1 - 1/F_2) * F_s > D_1,$$

and, through a similar reasoning:

$$abs(1/F_1-1/F_2)*F_s>D_2.$$

By combining these two equations, the following relation is obtained:

$$abs(1/F_1-1/F_2)*F_s>\max(D_1,D_2)=2*V_{max}*F_s/(c*\min(F_1,F_2)),$$

which may be written:

$$abs(F_1-F_2)/\max(F_1,F_2)>2*V_{max}/c$$

This relation gives the minimum deviation between the frequencies as a function of the maximum velocity of the drones.

Such condition may also be expressed as follows: "given a drone D1 at the frequency $F_1$ and a maximum relative velocity $V_{max}$, then the minimum frequency $F_2$, higher than $F_1$, of another drone D2 will be:

$$F_2=F_1*2*V_{max}/c/(1-2*V_{max}/c)."$$

The same reasoning can be generalized, further taking into account the non-zero width W of the peaks. The thresholds are then:

$$D_1=2*V_{max}*F_s/(c*F_1)+W$$

and $$D_2=2*V_{max}*F_s/(c*F_2)+W.$$

In the same way, it is demonstrated that the frequencies must verify:

$$abs(F_1-F_2)/\max(F_1,F_2)>2*V_{max}/c+W*\min(F_1,F_2)/F_s$$

that is to say that: "given a drone D1 at the frequency $F_1$ and a maximum relative velocity $V_{max}$, then the minimum frequency $F_2$, higher than $F_1$, of another drone will be:

$$F_2=F_1*2*V_{max}/c/(1-2*V_{max}/c)+W*F_1/F_s/(1-2*V_{max}/c)."$$

The invention claimed is:

1. A method of estimating a distance by ultrasonic telemetry, said method being implemented by a drone (D1), in particular for measuring the altitude (h) of the drone, comprising:
   a) emitting, from a time origin, an ultrasound burst, said burst being repeated at a predetermined recurrence frequency;
   b) after the end of each emission and over the duration of a time frame (n−1, n, n+1, . . . ) separating two consecutive emissions, receiving a plurality of successive signal peaks appearing at respective times of arrival during the same frame, wherein said successive signal peaks include spurious peaks ($E'_{n-1}$, $E'_n$, $E'_{n+1}$, . . . ) and one useful peak ($E_{n-1}$, $E_n$, $E_{n+1}$, . . . ) corresponding to the distance to be estimated;
   characterized in that:
       it is provided a preliminary step of adjusting said recurrence frequency to a predetermined value different from the corresponding recurrence frequency of another drone (D2) intended to be used at the same time as the considered drone,
       the step b) includes the possible reception of spurious peaks due to the emission of ultrasound bursts from the other drone; and
       for the considered drone (D1) implementing the method, said method further comprises:
   c) for two consecutive frames, comparing the times of arrival of the p signal peaks of the current frame with the times of arrival of the q signal peaks of the previous frame, and determining, for each of the p.q pairs of peaks, a corresponding relative time gap;
   d) applying to the p.q relative time gaps determined at step c) at least one criterion of selection making it possible to retain only one peak of the current frame, wherein the step d) includes, as another criterion of selection, a filtering by which are retained only the peaks of the current frame for which the relative time gap with the peaks of the previous frame is lower than a predetermined threshold; and
   e) estimating the distance based on the time of arrival of the peak retained at step d) with respect to the time of emission of the last burst,
wherein the respective recurrence frequencies of the considered drone (D1) and of the other drone (D2) are adjusted so that the difference between these frequencies verifies the following relation:

$$abs(F_1-F_2)/\max(F_1,F_2)>2*V_{max}/c+W*\min(F_1,F_2)/F_s$$

wherein:
   $F_1$ is the recurrence frequency of said considered drone,
   $F_2$ is the recurrence frequency of said other drone,
   $V_{max}$ is the maximum velocity, in the direction of estimation of the distance, of said considered drone,
   c is the velocity of sound propagation,
   W is the time width of the burst, and
   $F_s$ is the sampling frequency of the received signal.

2. The method of claim 1, wherein the difference between the recurrence frequencies of the considered drone (D1) and of the other drone (D2) is advantageously comprised between 3% and 10%, preferably of 5%.

3. The method of claim 1, wherein said threshold is determined as a function of the maximum variation of the acoustic path between two positions of the drone at two consecutive times of emission, for a displacement of the drone at its maximum velocity in the direction of estimation of the distance.

4. The method of claim 3, wherein said threshold may notably be determined by the expression:

$$D=2*V_{max}*F_s/(c*F_{drone})$$

wherein:
   D is the threshold value expressed as a number of samples,
   $V_{max}$ is the maximum velocity of the drone in the direction of estimation of the distance,
   $F_s$ is the sampling frequency of the received signal,
   c is the velocity of sound propagation, and
   $F_{drone}$ is the recurrence frequency of the burst emissions.

5. The method of claim 3, wherein the threshold is increased by a corrective term that is a function of the time width of the ultrasound burst.

6. The method of claim 5, wherein said threshold is determined by the expression:

$$D=2*V_{max}*F_s/(c*F_{drone})+W.F_s,$$

D is the threshold value expressed as a number of samples,
$V_{max}$ is the maximum velocity of the drone in the direction of estimation of the distance,
$F_s$ is the sampling frequency of the received signal,
c is the velocity of sound propagation,
$F_{drone}$ is the recurrence frequency of the burst emissions, and
W is the time width of the burst, expressed as a number of samples.

7. The method of claim 1, wherein the step d) also includes, as an additional criterion of selection, in case a plurality of peaks are kept after the filtering, selecting the first peak of the current frame in the order of occurrence of the successive signal peaks.

8. The method of claim 1, wherein the step d) also includes, as an additional criterion of selection, in case a plurality of peaks are kept after the filtering, selecting the last peak of the current frame in the order of occurrence of the successive signal peaks.

9. The method of claim 1, wherein, at the end of step c) of comparing the times of arrival of the p signal peaks of the current frame with the times of arrival of the q signal peaks of the previous frame, and of determining, for each of the p.q pairs of peaks, a corresponding relative time gap, in case of detected presence of two peaks in the same relative time gap interval, then it is provided a step of selecting the single peak of the previous frame for the distance estimation at step e), instead of that of the current frame.

* * * * *